(12) United States Patent
Iwasa et al.

(10) Patent No.: US 10,378,644 B2
(45) Date of Patent: Aug. 13, 2019

(54) CONTROL DEVICE FOR AUTOMATIC TRANSMISSION FOR VEHICLE

(71) Applicant: JATCO Ltd, Fuji-shi, Shizuoka (JP)

(72) Inventors: Hiroki Iwasa, Atsugi (JP); Tetsuya Izumi, Ayase (JP)

(73) Assignee: JATCO LTD, Fuji-Shi, Shizuoka (JP)

( * ) Notice: Subject to any disclaimer, the term of this patent is extended or adjusted under 35 U.S.C. 154(b) by 0 days.

(21) Appl. No.: 15/560,701

(22) PCT Filed: Mar. 7, 2016

(86) PCT No.: PCT/JP2016/056915
§ 371 (c)(1),
(2) Date: Sep. 22, 2017

(87) PCT Pub. No.: WO2016/152469
PCT Pub. Date: Sep. 29, 2016

(65) Prior Publication Data
US 2018/0106361 A1    Apr. 19, 2018

(30) Foreign Application Priority Data

Mar. 26, 2015    (JP) .................................. 2015-065176

(51) Int. Cl.
*F16H 59/06* (2006.01)
*F16H 59/18* (2006.01)
(Continued)

(52) U.S. Cl.
CPC ........... *F16H 59/06* (2013.01); *B60W 40/105* (2013.01); *F16H 59/18* (2013.01); *F16H 59/40* (2013.01);
(Continued)

(58) Field of Classification Search
None
See application file for complete search history.

(56) References Cited

U.S. PATENT DOCUMENTS

2010/0114424 A1    5/2010    Morris et al.
2012/0109474 A1    5/2012    Morris et al.
(Continued)

FOREIGN PATENT DOCUMENTS

JP    H04-151068 A    5/1992
JP    H05-180326 A    7/1993
(Continued)

*Primary Examiner* — Justin Holmes
(74) *Attorney, Agent, or Firm* — Foley & Lardner LLP

(57) ABSTRACT

Disclosed is a control apparatus for a vehicular transmission comprising: a vehicle speed sensor; an accelerator opening angle sensor; and a gear-shift control section (8D) of a CVTECU 8. The vehicle speed sensor includes: an output shaft rotation speed sensor (90) configured to detect a rotation speed (rotation numbers) of an output shaft (41) of the automatic transmission; road wheel rotation speed sensors configured to detect rotation speeds (rotation numbers) of four road wheels (90B through 90E); and a vehicle speed calculating section (8B) of CVTECU 8 configured to calculate the vehicle speed from the information of the road wheel rotation speeds when a preset predetermined condition as a condition under which vertical variations of the rotation speed of the output shaft are generated is established and calculate the vehicle speed from the output shaft rotation speed information if the predetermined condition is not established.

7 Claims, 10 Drawing Sheets

(51) Int. Cl.
*F16H 59/40* (2006.01)
*F16H 59/42* (2006.01)
*F16H 63/50* (2006.01)
*B60W 40/105* (2012.01)
*F16H 61/662* (2006.01)
*F16H 61/02* (2006.01)
*F16H 61/08* (2006.01)
*F16H 61/664* (2006.01)
*F16H 59/44* (2006.01)
*F16H 59/46* (2006.01)
*F16H 59/70* (2006.01)
*F16H 57/00* (2012.01)

(52) U.S. Cl.
CPC ....... *F16H 59/42* (2013.01); *F16H 61/66227* (2013.01); *F16H 63/50* (2013.01); *B60W 2520/28* (2013.01); *F16H 59/44* (2013.01); *F16H 59/46* (2013.01); *F16H 61/0265* (2013.01); *F16H 61/08* (2013.01); *F16H 61/6645* (2013.01); *F16H 2057/0012* (2013.01); *F16H 2059/704* (2013.01)

(56) References Cited

U.S. PATENT DOCUMENTS

| | | | |
|---|---|---|---|
| 2015/0219210 A1* | 8/2015 | Fairgrieve | B60K 28/16 701/58 |
| 2015/0260277 A1* | 9/2015 | Zaremba | F16H 59/50 701/51 |
| 2016/0167654 A1* | 6/2016 | Fujita | B60W 30/18 701/53 |
| 2016/0214610 A1* | 7/2016 | Kotsuji | B60K 6/48 |
| 2016/0215878 A1* | 7/2016 | Hatajima | F16H 61/12 |

FOREIGN PATENT DOCUMENTS

| | | |
|---|---|---|
| JP | 2009-243623 A | 10/2009 |
| JP | 2013-187959 A | 9/2013 |

\* cited by examiner

TRANSMISSION OUTPUT SHAFT SIDE
⇒ INFLUENCE OF SHOCK IS EASY TO RECEIVE AND ROTATION VARIATION EASILY OCCURS

ROAD WHEEL SHAFT SIDE
⇒ DUE TO SUCH A HEAVY INERTIA SIDE AS VEHICLE BODY, ROTATION VARIATION IS DIFFICULT TO BE VARIED AGAINST IMPACT INPUT

CONTROL DEVICE FOR AUTOMATIC TRANSMISSION FOR VEHICLE

TECHNICAL FIELD

The present invention relates to a control apparatus for a vehicular automatic transmission suitable for use in the vehicular automatic transmission using a continuously variable transmission mechanism.

BACKGROUND ART

In a drive train of a vehicle (an automotive vehicle), a power transmission system which performs a gear-shift through a gear-shift mechanism and a speed-reduction mechanism through which an output torque of a driving source such as an engine (internal combustion engine) and an motor (electrically driven motor) is gear-shifted and is transmitted to driving wheels. Since toothed gears are used in the gear-shift mechanism and the speed-reduction mechanism, vibrations and noise sounds due to backrushes of the toothed gears are sometime generated so that vehicle occupants including a vehicle driver give unpleasant feelings.

For example, when positive-or-negative inversion occurs in the driving torque acted upon a driving shaft (driving wheels), vibrations, noises, and shocks are, accordingly, often introduced due to backlashes of the toothed gears.

In a Patent Document 1 discloses a technique to suppress the generation of the above-described shocks in association with the positive-or-negative inversion of this driving torque and to suppress a reduction in an energy efficiency. This technique estimates the driving torque acted upon the driving wheels when a brake is activated during a traveling of the vehicle and limits the output torque of the motor by a motor target braking torque of a variation rate smaller than a prescribed ordinary rate.

PRE-PUBLISHED DOCUMENT

Patent Document 1: a Japanese Patent Application Laid-open Publication No. 2013-187959.

DISCLOSURE OF THE INVENTION

Problem to be Solved by the Invention

Incidentally, although a generation situation of the shocks in Patent Document 1 is different, as a result of vehicle tests, it was determined that there are cases where an abnormal sound called a rattle sound is generated from a drive train of the vehicle when the vehicle is traveling in a constant speed state in the proximity of a zero longitudinal acceleration. In addition, it was determined that, under such a rattle sound generation situation as described above, vertical vibrations (vibrations) of rotation numbers (rotation speeds) in the drive train of the vehicle are often generated. In this way, a phenomenon such that the rattle sound and rotation speed variations are generated is considered to be caused by, as will be described later, positive-or-negative repetitive inversions of the driving torque. That is, as the result of periodic variations of the driving torque, it was thought that the rattle sound and the rotation speed variations are generated due to the rotation speed variations and backlashes of the toothed gears in association with the periodic variations.

In addition, for example, since an output shaft of the transmission is connected to the driving wheels via toothed wheel mechanisms of the driving wheels and final speed reduction mechanisms, the rotation speed of the output shaft of the transmission corresponds to the rotation speed (road wheel rotation speed) of each of the driving wheels. The road wheel (rotation) speed corresponds to the vehicle speed and it is often carried out to convert the road wheel speed into the vehicle speed. However, since the road wheel (rotation) speed is affected by a differential in left and right road wheels, it is general practice that the rotation speed of the transmission output shaft is converted into the vehicle speed. However, when the vehicle is traveling in the proximity of zero longitudinal acceleration, as described above, the vertical variations of the transmission output shaft rotation speed are generated due to the periodic variations of the driving torque so that the rattle sound and the vertical variations of the transmission output shaft rotation speed are accordingly generated due to the backlashes of the toothed gear mechanism intervened between the output shaft of the transmission and the driving wheels.

Therefore, for example, a transmission output shaft rotation speed is detected and the detected transmission output shaft rotation speed is converted into a vehicle speed to be used for a control of the vehicle. At this time, a vehicle speed value different from an actual vehicle speed due to the vertical variations of the rotation speed is used for the control of the vehicle so that the control of the vehicle cannot, often, be suitably carried out. A gear-shift control of the automatic transmission is carried out on a basis of a vehicle speed information and an engine load information. However, if the vehicle information receives an effect of the above-described vertical variations of the rotation speed, the gear-shift control cannot suitably be carried out.

Especially, in a case where the automatic transmission is a continuously variable transmission, it was determined that, when the vehicle speed information receives the influence of the vertical variations of the rotation speeds, the vehicle speed information appears in a vehicular behavior as a longitudinal G vibration of the vehicle. In a case of the continuously variable transmission, even slight vertical variations of the vehicle speed is reflected on an indicated value of a gear (speed) ratio so that vertical variations of the gear (speed) ratio is introduced.

If the gear (speed) ratio is vertically varied, an engine rotation speed is accordingly vertically varied. When the engine rotation speed is vertically varied, an input torque to a primary shaft and an inertia torque of the primary shaft are vertically vibrated. A drive shaft torque is accordingly varied so that, finally, the drive shaft torque vertical variation is considered to be appearing in the vehicular behavior as the longitudinal G vibration of the vehicle.

With such a task as described above in mind, it is, therefore, an object of the present invention to provide a control apparatus for a vehicular automatic transmission which is capable of suppressing an influence of the vertical variations on the control of the automatic transmission in a case where the vertical variations are generated on a rotational element in a state in which the vehicle is traveling in the proximity of zero longitudinal acceleration, in a case where the transmission output shaft rotation speed is detected and the control of the automatic transmission is carried out using the detected transmission output shaft rotation speed as the vehicle speed information.

Means for Solving the Problem (1) In order to achieve the above-described object, there is provided a control apparatus for a vehicular automatic transmission, the automatic transmission being equipped in a power transmission system between a driving source and driving wheels of a vehicle, comprising: vehicle speed detecting means for detecting a vehicle speed of the vehicle; accelerator opening angle detecting means for detecting an accelerator opening angle of the vehicle; and gear-shift control means for controlling a gear ratio of the automatic transmission on a basis of the vehicle speed detected by the vehicle speed detecting means and the accelerator opening angle detected by the accelerator opening angle detecting means, wherein the vehicle speed detecting means is constituted by: output shaft rotation numbers detecting means for detecting rotation numbers of an output shaft of the automatic transmission; road wheel rotation speed detecting means for detecting rotation numbers of road wheels equipped in the vehicle; and calculating means for calculating the vehicle speed from an information of the road wheel rotation numbers when a preset predetermined condition in a form of a condition under which vertical variations of the output shaft rotation numbers are generated is established and for calculating the vehicle speed from the information of the output shaft rotation speed if the above-described preset predetermined condition is not established.

(2) It is preferable that the road wheel rotation speed detecting means is installed for each of a plurality of road wheels and the calculating means selects at least one of the road wheel rotation speed detecting means whose vertical variation width of the detected road wheel rotation speed from among the plurality of road wheel rotation speed detecting means at a time point at which the predetermined condition is determined to be established are equal to or below a reference value and calculates the vehicle speed from the rotation speed information of the selected road wheel rotation speed detecting means.

(3) It is preferable that the road wheel rotation speed detecting means is installed for each of a plurality of road wheels and the calculating means selects any one or more of the plurality of road wheel rotation speed detecting means whose rotation speed is nearest to the output shaft rotation speed detected by the output shaft rotation speed detecting means from among the plurality of road wheel rotation speed detecting means at a time point at which the predetermined condition is determined to be established and calculates the vehicle speed from the rotation speed information of the selected road wheel rotation speed detecting means.

(4) It is preferable that the calculating means, in a case where all of vertical variation widths of the plurality of road wheel rotation speeds are not equal to nor below the reference value when the predetermined condition is established, determines whether the vertical variation width of the rotation speed of the output shaft is larger than each of the vertical variation widths of the rotation speeds of all road wheel rotation speed detecting means, calculates the vehicle speed from an average value of the plurality of the road wheel rotation speeds if a positive determination that the vertical variation width of the rotation speed of the output shaft is larger than each of the vertical variation widths of the rotation speeds of all road wheel rotation speed detecting means is made, and calculates the vehicle speed from the output shaft rotation speed if a negative determination is made.

(5) It is preferable that a notch filter configured to eliminate a particular frequency area from the rotation speed information inputted to the calculating means is equipped, the particular frequency area includes a frequency area of a frequency component related to the vertical variations of the output shaft rotation speed generated due to a periodic variation of the driving torque inputted to the driving wheels in a state in which the driving torque of the driving source inputted to the automatic transmission is minute and the calculating means calculates the vehicle speed from the rotation speed information detected by the output shaft rotation speed detecting means which is filter processed through the notch filter.

(6) It is preferable that the particular frequency area includes a frequency area of vibrations of the rotational element in accordance with a gear ratio related to a natural frequency of the driving source.

(7) It is preferable that the calculating means includes rate processing means for performing a rate processing configured to smooth a switching when the rotation speed information to calculate the vehicle speed is switched.

(8) It is preferable that the predetermined condition includes three conditions such that an output torque request to the driving source is detected, the detected driving torque of the driving source is in a minute state equal to or below a torque determination threshold value, and a vehicular acceleration is in a minute state equal to or below an acceleration determination threshold value, all of the three conditions being established.

(9) The automatic transmission is preferably a continuously variable transmission.

Effect of the Invention

For example, when the vehicle is traveling in a state in which the longitudinal acceleration is approximately zero, the driving torque inputted to the driving wheels sometimes periodically varies and vertical variations occur in rotation numbers of a rotational element present subsequently to the output shaft of the automatic transmission due to the periodic variation of the driving torque. When the gear-shift control of the automatic transmission is carried out in accordance with the vehicle speed based on detected rotation numbers of the rotational element, the vertical variations of the rotation numbers give an influence on the gear-shift control. Whereas, according to the present invention, if preset predetermined conditions in a form of a condition of generating the vertical variations of the rotation numbers of the output shaft are established, the vehicle speed is calculated from the information of tire wheel rotation numbers and, if the predetermined conditions are not established, the vehicle speed is calculated from the information of the rotation numbers of the output shaft. Since, even in a case where the vertical variations of the output shaft rotation numbers (speed) are generated, the vertical variations of the tire wheel rotation speeds are small (few), the influence of the vertical variations of the rotation numbers is suppressed on the vehicle speed used to control the gear-shift and an appropriate gear ratio can be controlled using this vehicle speed.

EMBODIMENT FOR CARRYING OUT THE INVENTION

Hereinafter, reference is made to the drawings in order to explain a preferred embodiment according to the present invention.

It should be noted that the preferred embodiment described hereinbelow is merely by way of an example only and there is no intention to eliminate various modifications and an application of technologies not explicitly described in the preferred embodiment described hereinbelow.

In addition, "rotation numbers" described in the explanation hereinbelow is "number of rotations (revolutions) per unit time" (for example, per minute) and corresponds to "rotation speed".

First, structures of a drive train and a control system of a vehicle in the preferred embodiment will be explained. It should be noted that a driving source and a power transmission system transmitting a driving force of the driving source to driving wheels are equipped in the drive train. In this embodiment, an engine (an internal combustion engine) is equipped as the driving source and an automatic transmission is equipped in the power transmission system. In this embodiment, an application of belt type continuously variable transmission (hereinafter, a belt type CVT or simply referred merely to as CVT) to the automatic transmission is exemplified. As the automatic transmission, another continuously variable transmission such as a toroidal CVT and a stepped automatic transmission can be applied.

[Whole System Configuration]

Figure 1:
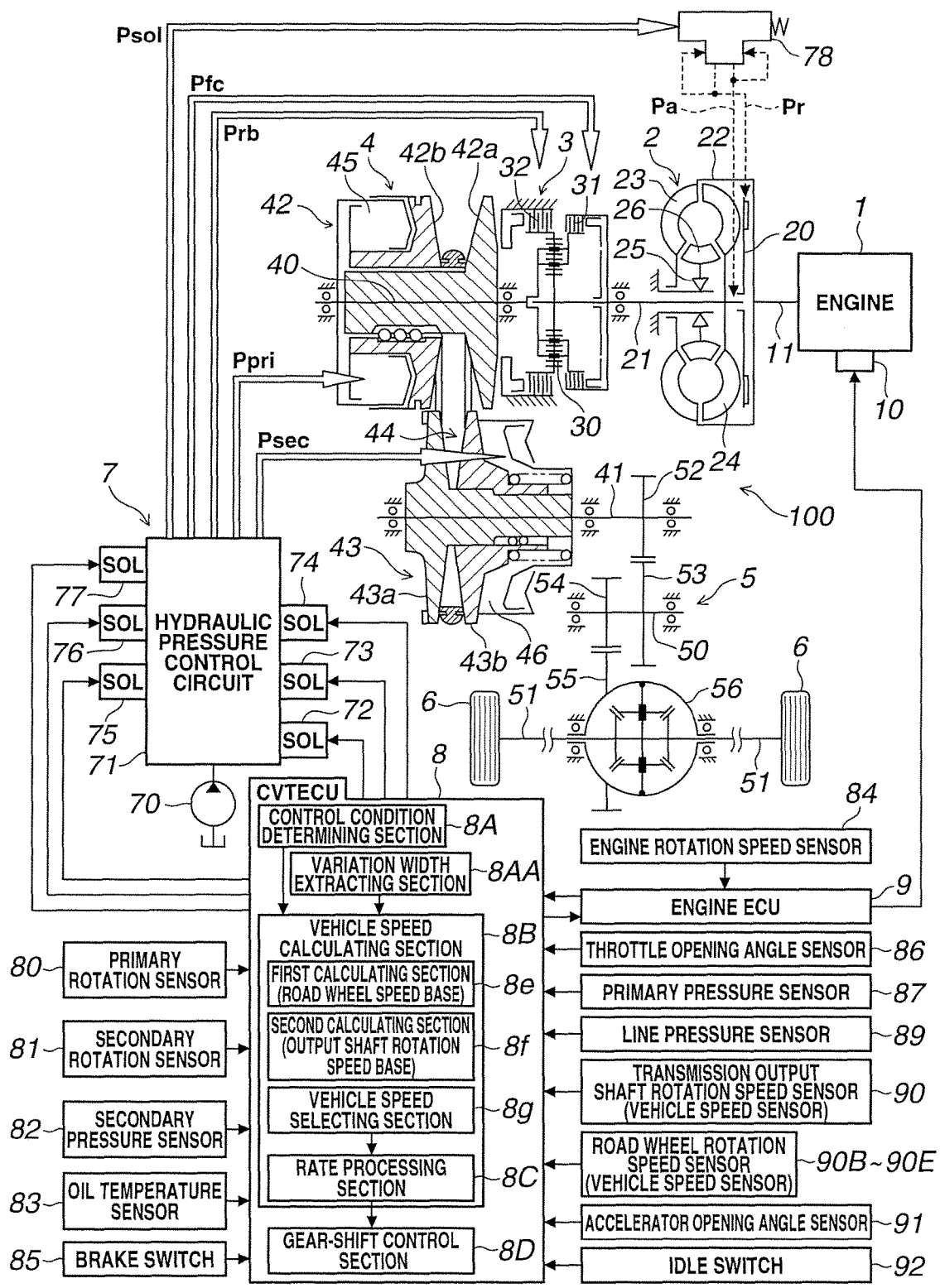
FIG. 1 is a whole configuration view representing a drive train of a vehicle and a control system of the vehicle to which a control apparatus for a vehicular transmission in a preferred embodiment according to the present invention is applicable.

FIG. 1 shows a configuration view representing the drive train and the control system of the vehicle related to the preferred embodiment.

As shown in FIG. 1, the drive train of the vehicle includes: engine 1 as the driving source; a torque converter 2 constituting a power transmission system; a forward-reverse switching mechanism 3; a belt type continuously variable transmission (herein also referred to as a variator) 4; a final speed-reduction mechanism 5; and driving wheels 6, 6. It should herein be noted that CVT 100 is constructed by housing torque converter 2, forward-reverse switching mechanism 3, and variator 4 into a transmission casing.

Engine 1 is provided with an output torque control actuator 10 which performs out an output torque control though a throttle valve open-closure operation, a fuel-cut operation, and so forth. This permits the engine to perform a control of an output torque through an external engine control signal other than the control of the output torque by an accelerator operation by a vehicle driver. It should be noted that the output torque of engine 1 is simply referred as to an engine torque.

Torque converter 2 is a starting element having a torque augmentation function and includes a lock-up clutch 20 which enables a direct coupling between an engine output shaft 11 (=a torque converter input shaft) and a torque converter output shaft 21. This torque converter 2 is constituted by a pump impeller 23 linked to engine output shaft 11 via a converter housing 22, a turbine runner 24 linked to torque converter output shaft 21, and a stator 26 installed in the casing via a one way clutch 25 as components.

In addition, lock-up clutch 20 is switching controlled in any one of a lock-up state (a clutch complete engagement (clutched) state), a lock-up state (a clutch complete release state), and a slip lock-up state (a clutch slip engagement state, in other words, although a difference rotation is present between the rotation numbers of a rotational member at an input side of the lock-up clutch and a rotational member at the output side of the lock-up clutch, a state in which the torque is transmitted from the input side to the output side) in accordance with a vehicle state and a driving state.

Forward/reverse switching mechanism 3 is a mechanism switches an input rotation direction to variator 4 between a normal rotation direction during a forward traveling and inversed rotation during a reverse (backward) traveling. This forward/reverse switching mechanism 3 includes: a double pinion type planetary gear 30; a forward clutch 31 (a forward side frictional engagement element) comprising a plurality of clutch plates; and a reverse brake 32 (a reverse side frictional engagement element) comprising a plurality of plate brakes.

Forward clutch 31 is engaged according to a forward clutch pressure Pfc during a selection of a forward traveling range such as a D range (a drive range). Reverse brake 32 is engaged according to a reverse brake during the selection of an R range which is a reverse traveling range. It should be noted that forward clutch 31 and reverse brake 32 are released by a drainage of forward clutch pressure Pfc and reverse brake pressure Prb during the selection of an N range (a neutral range, non-traveling range), respectively.

Variator 4 is provided with a continuously variable transmission function which varies a gear ratio (a speed ratio) between transmission input rotation numbers and transmission output rotation numbers in a stepless manner. Variator 4 includes: a primary pulley 42; a secondary pulley 43; and a belt 44. Primary pulley 42 is constituted by a fixture pulley 42a and a slide pulley 42b. Slide pulley 42b moves in an axial direction according to a primary pressure Pri introduced into a primary pulley pressure chamber 45. Secondary pulley 43 is constituted by a fixture pulley 43a and a slide pulley 43b. Slide pulley 43b moves in the axial direction according to a secondary pressure Psec introduced into a secondary pressure chamber 46.

Sheave surfaces which are respective opposing surfaces of fixture pulley 42a and slide pulley 42b of primary pulley 42 and sheave surfaces which are respective opposing surfaces of fixture pulley 42a and slide pulley 42b are letter V shapes. Flank surfaces of both sides of belt 44 are contacted on these respective sheave surfaces. The gear ratio is modified by the modification of a winding radius of belt 44 onto primary pulley 42 and secondary pulley 43.

Final speed reduction mechanism 5 is a mechanism performs a speed reduction of a transmission output rotation from transmission output shaft 41 of variator 4 and provides a differential function to transmit left and right driving wheels 6, 6. This final speed reduction mechanism 5 is interposed between transmission output shaft 41 and left and right drive shafts 51, 51 and includes: a first gear 51 installed in transmission output shaft 41; second gear 53 and third gear 54 installed on an idler shaft 50; a final speed reduction gear 55; and a front differential gear 56 having a differential function.

It should herein noted that, in FIG. 1, as left and right drive shafts 51, 51 and left and right driving wheels, those related to left and right front road wheels are indicated and as differential gear 56, a front differential gear is indicated. However, as driving wheels 6, 6 and left and right drive shafts 51, 51, those related to left and right rear road wheels are present although not shown in FIG. 1. As differential gear 56, a rear wheel differential gear connected to the left and right road wheels via a transfer is equipped as well.

From among the control system of the vehicle, especially, a control system of CVT 100, as shown in FIG. 1, includes: a hydraulic pressure control unit 7; and a CVT electronic control unit (CVTECU) 8 as transmission control means. In addition, an engine electronic control unit (engine ECU) 9 as driving source control means which transmits or receives an information to or from this CVT electronic control unit 8.

It should herein be noted that each electronic control unit (ECU: Electronic Control Unit) 8, 9 is constituted by an input/output unit, a memory unit (ROM, RAM, BURAM, and so forth) into which a multiple number of control programs are incorporated, a Central Processing Unit (CPU), a timer, and so forth. The control means according to the present invention is constituted by these CVTECU (transmission control means) 8 and engine ECU (driving source control means).

Hydraulic pressure control unit 7 is a control unit which produces a primary pressure Ppri introduced into primary pressure chamber 45, a secondary pressure Psec introduced into secondary pressure chamber 46, a forward clutch pressure Pfc to forward clutch 31, a reverse brake pressure Prb to reverse brake 32, and a solenoid pressure Psol to lock-up control valve 78. Hydraulic pressure control unit 7 includes an oil pump 70 and a hydraulic pressure control circuit 71. Hydraulic pressure control circuit 71 includes: a line pressure solenoid 72; a primary pressure solenoid 73; a secondary pressure solenoid 74; a forward clutch pressure solenoid 75; a reverse brake pressure solenoid 76; and a lock-up solenoid 77.

Line pressure solenoid 72 serves to pressure regulate a working oil supplied from oil pump 70 under pressure to a commanded line pressure PL in response to a line pressure command outputted from CVTECU 8.

Primary pressure solenoid 73 serves to pressure reduction regulate line pressure PL to a primary pressure Ppri commanded as an original pressure in response to a forward clutch pressure command outputted from CVTECU 8.

Secondary pressure solenoid 74 serves to pressure reduction regulate line pressure PL to a secondary pressure Psec commanded as the original pressure in response to a secondary pressure command outputted from CVTECU 8.

Forward clutch pressure solenoid 74 serves to pressure reduction regulate line pressure PL to a forward clutch pressure Pfc commanded as the original pressure in response to a reverse brake pressure command outputted from CVTECU 8.

Reverse brake pressure solenoid 76 serves to pressure reduction regulate line pressure PL to a reverse brake pressure Prb commanded as the original pressure in response to a reverse brake pressure command outputted from CVTECU 8.

Lock-up solenoid 77 produces a solenoid pressure Psol as a command signal pressure to a lock-up control valve 78 in response to a command from CVTECU 8. Lock-up control valve 78 produces a lock-up clutch engagement pressure and a lock-up clutch release pressure, with solenoid pressure Psol as an operation signal pressure, in order for a lock-up difference pressure $\Delta P$ ($\Delta P=Pa-Pr$) which is a difference pressure of the forward-or-reverse oil chamber to give a value based on a command from CVTECU 8.

CVTECU 8 performs a line pressure control such that a command to obtain a target line pressure in accordance with a throttle (valve) opening angle or so forth is outputted to line pressure solenoid 72, a gear-shift hydraulic pressure control such that a command to obtain a target gear ratio in accordance with a vehicle speed, la throttle valve opening angle, and so forth is outputted to primary pressure solenoid 73 and secondary pressure solenoid 74, a forward-or-reverse switching control such that a command to control the engagement-or-release of forward clutch 31 and reverse brake 32 is outputted to forward clutch pressure solenoid 75 and reverse brake pressure solenoid 76, and a control such that a command is outputted to lock-up solenoid 76 to perform the engagement (complete engagement), the release, or the slip engagement (clutch slipping engagement) of lock-up clutch 20.

Sensor information and switch information from a primary rotation sensor 80, a secondary rotation sensor 81, a secondary pressure sensor 82, an oil temperature sensor 83, an engine rotation speed (rotation numbers) sensor 84, a brake switch 85, a throttle opening angle sensor 86, a primary pressure sensor 87, a line pressure sensor 89, a transmission output shaft rotation speed (rotation numbers) sensor (vehicle speed sensor) 90, road wheel rotation speed sensors (vehicle speed sensor) 90B through 90E, an accelerator opening angle sensor 91, and an idle switch 92, and so forth are inputted to this CVTECU 8.

In addition, a torque information is inputted to CVTECU 8 from engine ECU 9 and engine ECU 9 outputs a torque request to engine 1. It should herein be noted that an inhibitor switch not shown detects a range position (D range, N range, R range, and so forth) selected by the vehicle driver through a shift lever and outputs a range position signal which accords with the selected range position.

Figure 6:
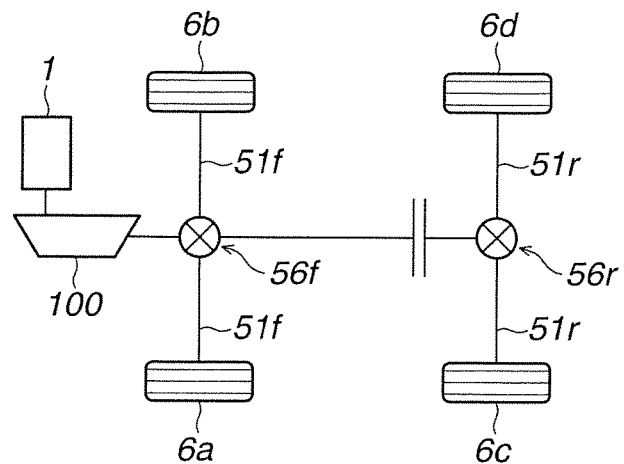
FIG. 6 is a rough configuration view of the drive train of the vehicle to which the control apparatus for the vehicular automatic transmission in the preferred embodiment according to the present invention is applicable.

In addition, the vehicle in this embodiment is, as shown in FIG. 6, a four-wheel drive vehicle in which all of left and right front road wheels 6a, 6b and left and right rear road wheels 6c, 6d are driving wheels. Driving wheel road wheel rotation speed sensors 90B through 90E detect road wheel rotation speeds of these respective driving wheels (tire rotation numbers). The power is transmitted to left and right front road wheels 6a, 6b via front wheel differential gear 56f having the differential function and left and right drive shafts 51f, 51f and the power is transmitted to left and right rear road wheels 6c, 6d via rear wheel differential gear 56r and left and right drive shafts 51r, 51r.

It should herein be noted that the present invention is not limited to the four-wheel drive vehicle and is, of course, applicable to another vehicle in which another drive system such as a two-wheel drive vehicle.

It should herein be noted that, even in the above-described other drive system vehicle, it is preferable to detect the rotation numbers of a multiple number of road wheels not limiting to the driving wheels/

[A Generation Mechanism of Abnormal Sound and Vertical Variations of the Rotation Numbers (Rotation Speed)]

A control apparatus for a vehicular automatic transmission in the preferred embodiment often generates an abnormal sound called a rattle sound and a vertical variation (a rotation speed vibration or simply referred to as a vibration) of the rotation numbers (rotation speed) of a rotational element in the power transmission system, when the vehicle is traveling in a state in proximity of zero longitudinal acceleration. Especially, since the vehicle speed determined from the rotation speed of the rotational element is used for the control of the gear ratio, an influence of the rotation number vibration on the gear ratio control can be suppressed. An inventor of the present application carried out an experiment through the vehicle having the structure shown in FIG. 1 and analyzed a reason why a phenomenon of the above-described abnormal sound and rotation number vibration is generated from a result of the experiment.

First, the inventor analyzed taking notice to a drive torque of the vehicle when the above-described phenomenon is generated while the vehicle was traveling in the state in proximity of zero longitudinal acceleration of vehicle. Consequently, it was determined that a situation under which such a phenomenon as described above is a case where such conditions as will be described hereinbelow are satisfied; namely, longitudinal acceleration Gv of the vehicle is in a minute state (approximately zero state) equal to or below a predetermined acceleration $Gv_0$ under a situation under which the driver was requesting the output torque request to engine 1 in a direct coupling state in which lock-up clutch 20 was engaged and a net driving torque Tdn in the drive train which is the driving torque added to driving wheels 6, 6 was in the minute state (a light load traveling state) equal to or below a predetermined torque $T_0$.

It should be noted that net driving torque Tdn is available as the torque information from engine ECU 9. For example, net driving torque Tdn can be obtained by correcting a command torque to the engine with a variance of the engine torque taken into account and correcting a net torque Tn which can be obtained by a subtraction with a friction by the gear ratio or so forth It should also be noted that the state in which longitudinal acceleration Gv is in proximity of zero is a state in which the vehicle is in, so called, a road load traveling. For example, this corresponds to a state in which the driving force used for the vehicular acceleration obtained by subtracting a running resistance rr which accords with the vehicle speed, a gradient, a vehicle weight, a road surface μ (frictional coefficient), and so forth from a net driving force Fn of the drive train obtained from a net driving torque Tn and a driving wheel rotation speed Nd.

Figure 2A:
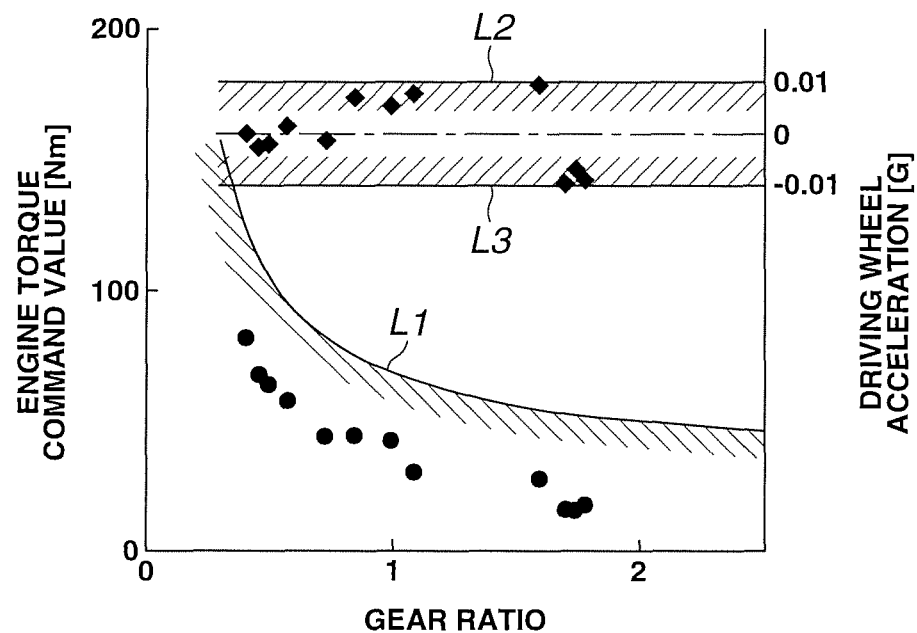
FIGS. 2(a) and 2(b) are explanatory views for explaining a driving region of the vehicle which is a controlled object of the control apparatus for the vehicular automatic transmission in the preferred embodiment according to the present invention.
Figure 2B:
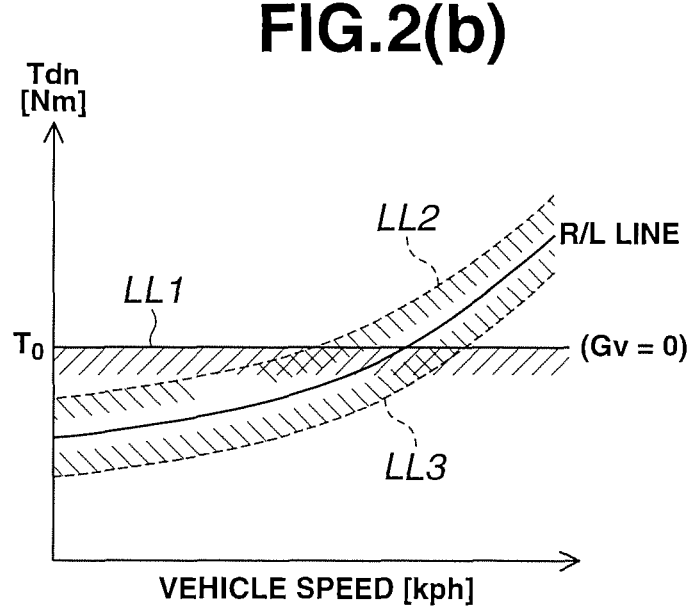

FIGS. 2(a) and 2(b) are graphs in which data on the result of the experiment are arranged under a condition under which such a phenomenon as the abnormal sound and the vibration is generated. In FIG. 2(a), data related to engine torque command value (net driving torque of the drive train) Tdn when the above-described phenomenon is generated (torque related data in circular marks) and data related to driving wheel acceleration (longitudinal acceleration Gv of the vehicle) when the above-described phenomenon is generated (acceleration related data in rhombus marks) when the above-described phenomenon is generated are indicated.

It should, herein, be noted that the torque related data (circular marks) are plotted for respective values of the gear ratio and the engine torque command when the above-described phenomenon is generated and the acceleration related data (rhombus marks) are plotted for respective values of the gear ratio and a driving wheel acceleration (longitudinal acceleration Gv) when the above-described phenomenon is generated.

From the torque related data (circular marks), the above-described phenomenon can be estimated to be generated in a region equal to or below a curve L1 as far as the gear ratio and the engine torque command are concerned. In addition, from the acceleration related data (rhombus marks), the above-described phenomenon can be estimated within a constant acceleration range (a range between straight lines L2 and L3) with a zero acceleration as a center.

FIG. 2(b) is a graph representing a torque related characteristic region (region equal to or below curve L1) in which the phenomenon shown in FIG. 2(a) is generated and an acceleration related characteristic region (the region between straight lines L2 and L3) in which the phenomenon shown in FIG. 2(a) is generated with respect to the vehicle speed and net driving torque Tdn of the drive train. As shown in FIG. 2(b), it can be said that the region in which the above-described phenomenon is generated is a region in which net driving torque Tdn is equal to or below a predetermined torque $T_0$ (equal to or below straight line LL1) and a region in a proximity of a road load line (R/L line) on which longitudinal acceleration Gv is in a proximity of zero (a region between curve LL2 and curve LL3).

FIGS. 3(a) through 3(d) shows explanatory views for explaining the generation mechanism of this phenomenon and indicate a situation during a power transmission by means of a power transmission purpose gear pair $G_1$, $G_2$ equipped in the power transmission system, for example, within CVT 100 or in final speed reduction mechanism 5. An input side gear $G_1$ is coupled to an input side shaft $S_1$, an output side gear $G_2$ is coupled to an output side shaft $S_2$, and input side gear $G_1$ is meshed with output side gear $G_2$. One driving wheel 6 is connected directly or indirectly to the side of output side shaft $S_2$.

In FIGS. 3(a) through 3(d), Tin denotes an input torque from input side shaft $S_1$, Tout denotes an output torque from output side shaft $S_2$ to driving wheel 6 side, $R_1$ denotes a rotation state of input side shaft $S_1$ and input side gear $G_1$, and $R_2$ denotes a rotation state of output side gear $G_2$ and output side gear $G_2$, respectively. In addition, the input torque from input side shaft $S_1$, in FIGS. 3(a) through 3(d), an interval between teeth of each gear $G_1$, $G_2$ is depicted exaggeratedly in order to clearly express a backlash of gear pair $G_1$, $G_2$.

Figure 3A:
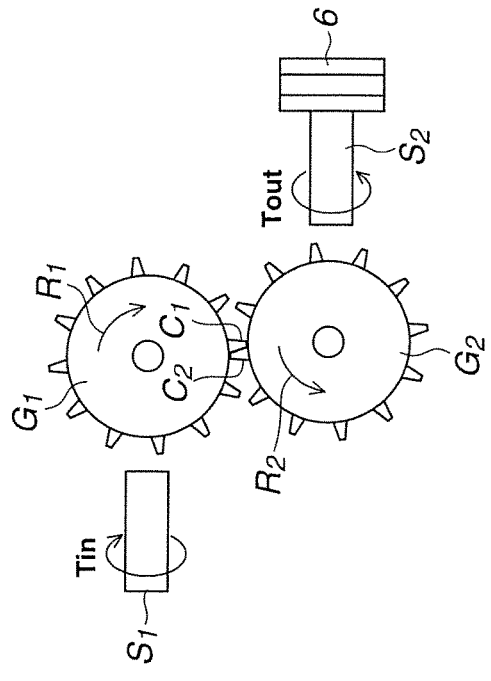
FIGS. 3(a) through 3(d) are schematic views for explaining a generation mechanism of a phenomenon related to a problem to be solved by the present invention.
Figure 3B:
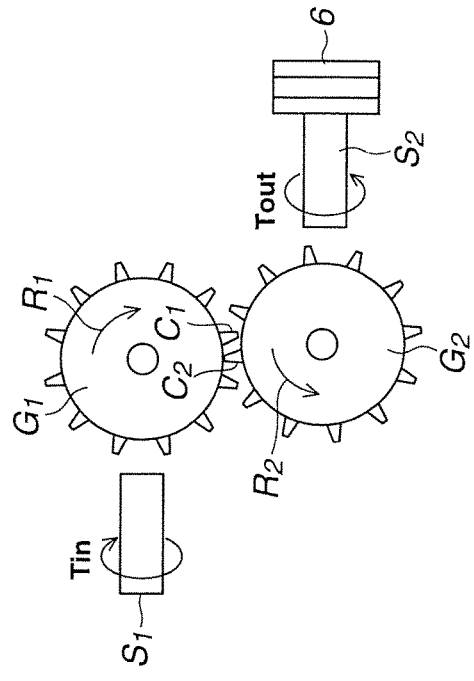
Figure 3C:
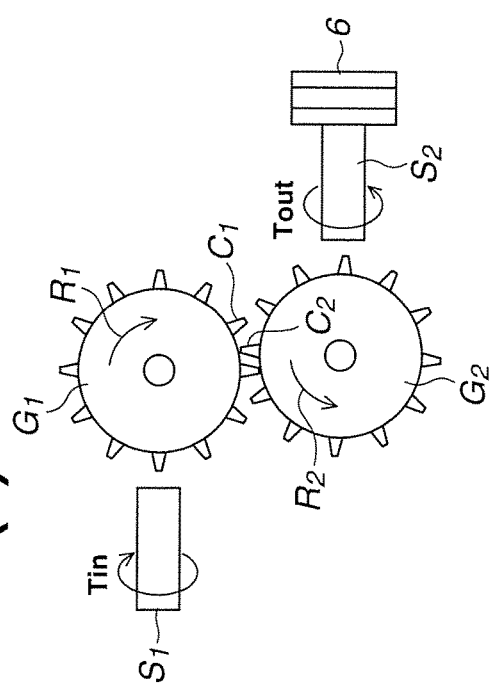
Figure 3D:
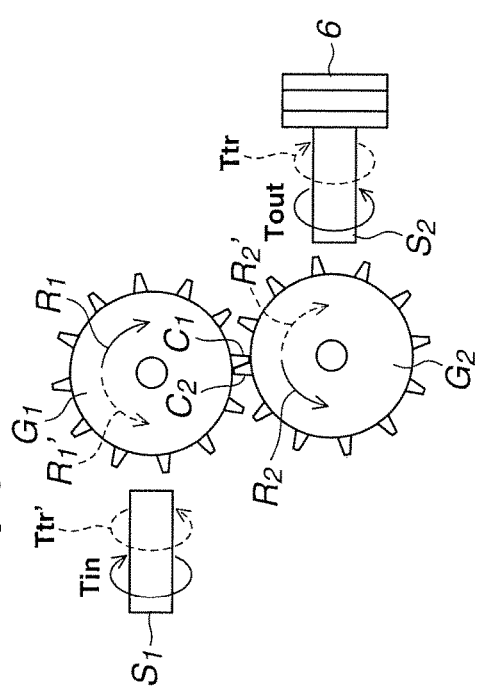

As shown in FIG. 3(a), when a tooth $C_1$ of gear $G_1$ and a tooth $C_2$ of gear $G_2$ to be meshed together are spaced apart from each other, a space between gear pair $G_1$, $G_2$ is in a run idle state. Input torque Tin from input side shaft $S_1$ is used only for a rise in speed (rotation numbers) of rotation of gear $G_2$ and the torque is not transmitted to output side shaft $S_2$ and does not contributes to the rise in the speed (rotation numbers) of rotation $R_2$ of gear $G_2$. Therefore, output torque Tout to driving wheel 6 side gives substantially zero (Nm).

As shown in FIG. 3(*b*), when mutual plays of gear pair $G_1$, $G_2$ are clogged and each of opposing surfaces of tooth $C_1$ of gear $G_1$ and tooth $C_2$ of gear $G_2$ is touched, input torque Tin from input side shaft $S_1$ is started to be transmitted to output side shaft $S_2$ via tooth $C_1$ and tooth $C_2$ and is started to contribute on the rise in the speed (rotation numbers) of rotation $R_2$ of gear $G_2$.

In this way, output torque Tout which accords with input torque Tin is transmitted to driving wheel 6 side. At this time, however, since a vehicle inertia is large (Naturally, a fact that each driving wheel 6 grips a road surface without slip is a prerequisite), the rotation numbers of driving wheels 6, 6 are almost not varied. Input shaft Tin transmitted by means of gear pair $G_1$, $G_2$ is acted to give a torsion to the shaft in the power transmission system (output side shaft $S_2$, drive shaft 51, and so forth) to driving wheels 6, 6.

When the torsion is developed on output side shaft $S_2$ in the power transmission system such as drive shaft 51 and a phase difference between the input side and the output side of output side shaft $S_2$ due to this torsion reaches a peak, this torsion is released. Therefore, the input side of output side shaft $S_2$ (namely, gear $G_2$ side) receives a torsion release torque Ttr in an opposite direction to input torque Tin and the input side of output side shaft $S_2$ and gear $G_2$ receive a rotational component to a reverse direction $R_2$'. Thus, rotation numbers of gear $G_2$ are brought down.

In addition, torsion release torque Ttr is acted upon gear $G_1$ and input side shaft $S_1$ via a contact section of tooth $C_1$ of gear $G_1$ and tooth $C_2$ of gear $G_2$. Thus, gear $G_1$ and the output side of input side shaft $S_1$ receive the rotational component to reverse direction $R_2$' and the rotation numbers are brought down. In addition, a reverse directional torque Ttr' which accords with torsion release torque Ttr is added to input side shaft $S_1$. If input torque Tin is small, such an influence of such an opposite directional torque transmission as described above receives so that gears $G_1$, $G_2$ provide again the run idle states and tooth $C_1$ of gear $G_1$ and tooth $C_2$ of gear $G_2$ to be meshed with each other at the next stage are separated from each other.

In this way, when such a situation that a torque transmission direction is periodically reversed between gear $G_1$ and gear $G_2$ (a periodical variation of the driving torque inputted to each driving wheel 6, 6, in other words, positive-and-negative inversions of the driving torque) is continued, it can be thought that a rattle sound is generated due to an impact caused by the backlash (a rattle shock) and, at the same time, vertical variations of the rotation numbers are generated on gear $G_1$ and its rotational shaft and gear $G_2$ and its rotational shaft.

The situation under which the torque transmission direction is reversed (the periodic variation of the driving torque inputted to each driving wheel 6, 6) is a situation under which input side shaft $S_1$ (gear $G_1$) and output side shaft $S_2$ (gear $G_2$) continue a substantially synchronized rotation and a magnitude of the driving torque (net driving torque Tdn) inputted from engine 1 side to driving wheel 6 side is so small as to receive that the influence of above-described torsion release torque Ttr.

The continuation of the substantially synchronized rotation between input side shaft $S_1$ and output side shaft $S_2$ is ordinarily a state in which a speed variation of input side shaft $S_1$ and output side shaft $S_2$ does not occur, in other words, a state in which vehicular longitudinal acceleration Gv is in a proximity of zero (acceleration zero condition). This indicates a case of the state of so-called road load traveling (light load traveling) shown in FIG. 2(*b*). In addition, the fact that the magnitude of the driving torque (net driving torque Tdn) is small is a situation under which net driving torque Tdn is equal to or below predetermined torque $T_0$ (equal to or below straight line LL1) shown in FIG. 2(*b*).

Hence, it can be thought that, when the following three conditions are satisfied, the phenomenon such as the generation of the rattle sound and generation of the vertical variations of the rotation numbers of a rotational element can be generated.

(A) The vehicle driver is requesting the output torque to engine 1.

(B) The driving torque outputted from engine 1 to each driving wheel 6 is in a minute state equal to or below predetermined torque $T_0$.

(C) Longitudinal acceleration Gv of the vehicle is in the state in the proximity of zero (namely, longitudinal acceleration Gv is the state equal to or below predetermined acceleration $Gv_0$.

[A Structure of the Control Apparatus for the Vehicular Automatic Transmission]

As shown in FIG. 1, in CVTECU 8 controlling CVT 100, a gear-shift control section (gear-shift control means) 8D configured to control gear ratio R of variator 4 is installed as a functional element. The control apparatus for the vehicular automatic transmission in the preferred embodiment includes: vehicle speed detecting means for detecting vehicle speed VS; an accelerator opening angle sensor 91 (accelerator opening angle detecting means) configured to detect an accelerator opening angle APO; and gear-shift control section configured to control the gear ratio of automatic transmission 100, namely, gear ratio R of variator 4 on a basis of detected vehicle speed VS and accelerator opening angle APO.

The vehicle speed detecting means includes: a transmission output shaft rotation speed (rotation numbers) sensor 90 (output shaft rotation numbers detecting means) configured to detect the rotation numbers (rotation speed) of transmission output shaft 41; road wheel speed sensors 90B through 90E (road wheel rotation numbers detecting means) configured to detect a road wheel speed (tire rotation numbers) of each of driving wheels 6a through 6d; and a vehicle speed calculating section 8B (calculating means) installed in CVTECU 8 as a functional element to calculate the vehicle speed from the rotation number information detected by the transmission output shaft rotation numbers (rotation speed) sensor 90 and detected by road wheel speed sensors 90B through 90E.

It should herein be noted that, in this embodiment, since the rotation numbers of transmission output shaft 41 is coincident with the rotation numbers of secondary pulley 43, a secondary pulley rotation sensor 81 can be diverted to transmission output shaft rotation speed (rotation numbers) sensor 90.

Vehicle speed calculating section 80 converts a detection signal of transmission output shaft rotation speed (rotation numbers) sensor 90 into a pulse signal and converts the rotation numbers of transmission output shaft 41 obtained on a basis of the number of pulses per unit time into vehicle speed VS on a basis of a reduction ratio of final speed reduction mechanism 5 and so forth interposed between transmission output shaft 41 and driving wheels 6, a tire diameter of each driving wheel 6, and so forth.

Figure 4:
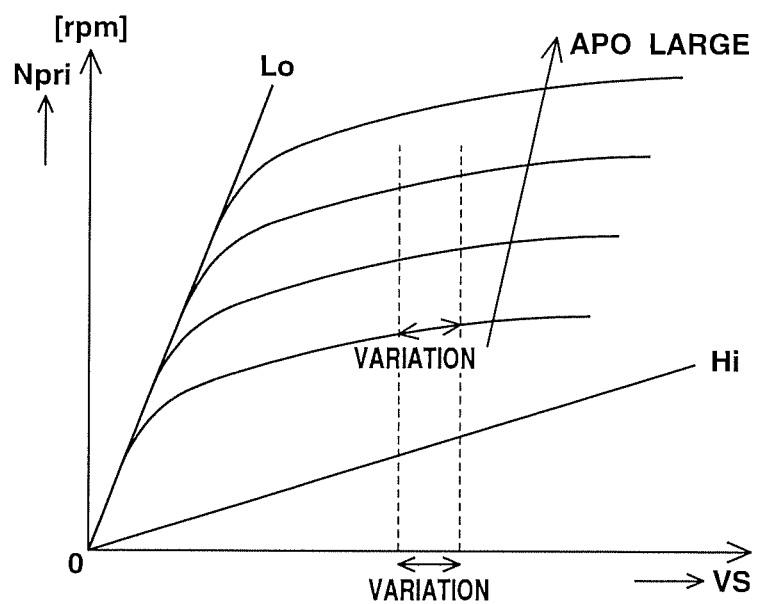
FIG. 4 is a speed line diagram for explaining a situation related to the problem to be solved by the present invention.

The gear-shift control by gear-shift control section 8D sets gear-shift lines, for example, as shown in a gear-shift line map in FIG. 4, which make correspondence between vehicle speed Vs and rotation numbers Npri of primary pulley 42 (if lock-up clutch 20 is completely engaged, rotation numbers Npri are equal to engine rotation numbers Ne) in accordance with accelerator opening angle APO and controls rotation numbers Npri of primary pulley 42 in accordance with vehicle speed VS and accelerator opening angle APO. Thus, gear ratio R is controlled.

As described above, there is a case where the rattle sound and the vertical variations of the rotation numbers of the rotational element are generated. In this case, the rotational element includes transmission output shaft 41 and the vertical variations of the rotation numbers of transmission output shaft 41 are accordingly generated. When vehicle speed VS is calculated from the rotational information detected by transmission output shaft rotation speed (rotation numbers) sensor 90, the rotational information includes the vertical variations of rotation numbers and calculated vehicle speed VS accordingly vertically varied.

As shown in the gear-shift map of FIG. 4, when calculated vehicle speed VS is vertically varied, gear ratio R is accordingly varied even if accelerator opening angle APO is constant.

Incidentally, a rotational torque $T_{DSFT}$ of the drive shaft which is net driving torque Tdn can be calculated as shown in the following equation (Equation 1).

$$T_{DSFT} = (T_{in} - I \ast d\omega_p/dt - T_{Fric}) \ast I_p \ast I_f \quad \text{(Equation 1)}$$

Figure 5:
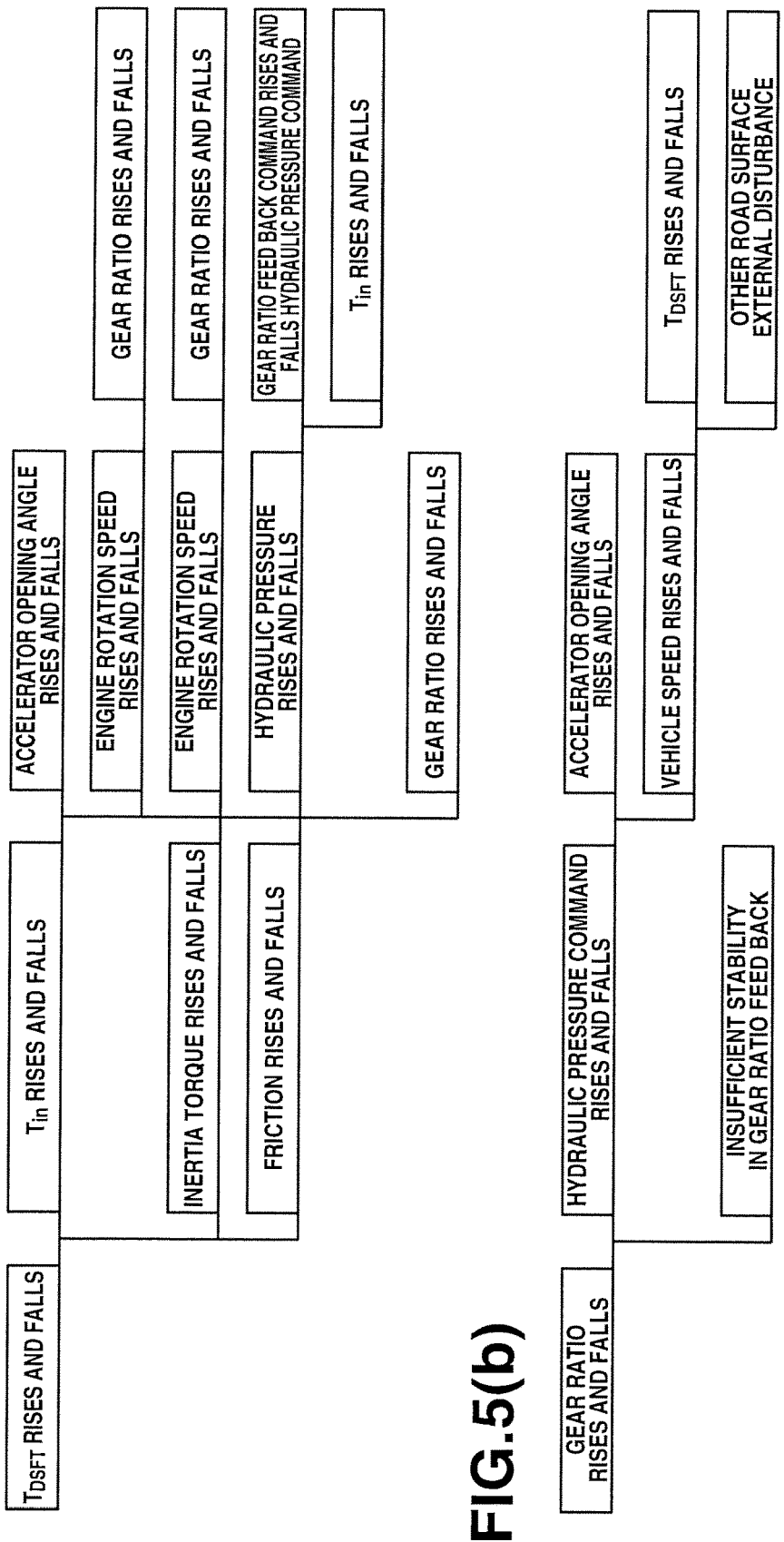
FIGS. 5(a) and 5(b) are block diagrams for explaining a relationship between the phenomenon related to the problem to be solved by the present invention and its factors.

$T_{DSFT}$: drive shaft torque [Nm]
$T_{in}$: primary shaft input torque [Nm]
I: primary shaft inertia [kgm$^2$]
$\omega_p$: PRI angular acceleration [rad/s$^2$]
$T_{Fric}$: a total friction of transmission [Nm]
Ip: variation gear ratio
If: final gear ratio In addition, FIG. 5(a) are views representing factors such that rotation $T_{DSFT}$ of the drive shaft is vertically varied are indicated at a right side thereof and factors such that the phenomenon of the factors is generated are indicated at a more right side. The factors such that drive shaft torque $T_{DSFT}$ is vertically varied include the vertical variations of primary input torque (=engine torque) $T_{in}$ inputted to CVT 100, the vertical variations of the inertia torque of the primary shaft, and the vertical variations of total friction $T_{Fric}$ of the transmission.

In addition, the factors of the vertical variations of input torque (=engine torque) $T_{in}$ include the vertical variations of accelerator opening angle APO and the vertical variations of engine rotation numbers Ne. The factors of the vertical variations of inertia torque I include the vertical variations of engine rotation numbers Ne.

The factors of the vertical variations of friction $T_{Fric}$ include the vertical variations of the hydraulic pressure and the vertical variations of gear ratio R.

Furthermore, the factors of the vertical variations of engine rotation numbers Ne include the vertical variations of gear ratio R. The factors of the vertical variations of the hydraulic pressure include the vertical variations of a hydraulic pressure command by a feedback of gear ratio R and the vertical variations of an input torque $T_{in}$.

FIG. 5(b) are views representing factors such that gear ratio R is vertically varied are indicated at a right side thereof and factors such that the phenomenon of the factors is generated are indicated at a more right side.

The factors of the vertical variations of gear ratio R include the vertical variations of a hydraulic pressure command and a failure in a stability of a gear ratio feedback.

The factors of the vertical variations of the hydraulic pressure command include the vertical variations of accelerator opening angle APO ad the vertical variations of vehicle speed VS. The factors of the vertical variations of vehicle speed VS include the vertical variations of drive shaft torque $T_{DSFT}$ and another road surface disturbance.

As shown in FIG. 5(a), an endless loop such that when gear ratio R vertically varies, drive shaft torque $T_{DSFT}$ vertically varies, when drive shaft torque $T_{DSFT}$ vertically varies, vehicle speed VS vertically varies, and gear ratio R vertically varies, is led. It should herein be focused on vehicle speed VS. Even if an actual vehicle speed is not varied, when vehicle speed VS used for the gear-shift control vertically varies, gear ratio R vertically varies, when gear ratio R vertically varies, drive shaft torque $T_{DSFT}$ vertically varies, and, when drive shaft torque $T_{DSFT}$ vertically varies, gear ratio R vertically varies. Thus, as described above, the endless loop is led.

In this way, since the vertical variations of vehicle speed VS used for the gear-shift control amplify the vertical variations of gear ratio R and drive shaft torque $T_{DSFT}$, a hunting level of the gear-shift is augmented, and the rattle shock is amplified, it becomes important to suppress the vertical variations of vehicle speed VS.

In the control apparatus in this embodiment, in order to suppress the vertical variations of vehicle speed VS, under the situation under which the vertical variations of the rotation numbers in the rotation numbers information detected by transmission output shaft rotation speed (rotation numbers) sensor 90 are generated, under a constant condition, in place of the rotation numbers detected by transmission output shaft rotation speed (rotation numbers) sensor 90 (output shaft rotation numbers), the calculation of vehicle speed VS by vehicle speed calculating section 8B is carried out using the rotation numbers (tire wheel rotation numbers (speeds)) detected by road wheel speed sensors 90B through 90E of the driving wheels.

In this way, a reason for the use of the rotation numbers information of road wheel speed sensors 90B through 90E is that the vertical variations of the tire rotation speeds (rotation numbers) (road wheel speeds) are slight even under the situation under which the vertical variations of the transmission output shaft rotation numbers are generated.

Figure 7A:
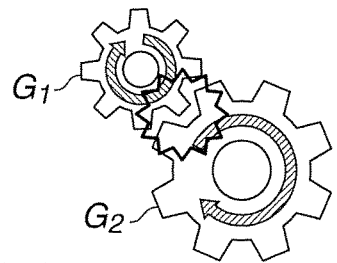
FIGS. 7(a) and 7(b) are explanatory views for explaining a phenomenon related to a control of the control apparatus for the vehicular automatic transmission in the preferred embodiment according to the present invention.

In details, as shown in FIG. 7(a), gear $G_1$ at transmission output shaft 41 side and gear $G_2$ at driving wheel 6 side reciprocate play sections due to the backlash of gears so that an impact shock occurs and the rattle sound and the vertical variations (rattle shock) of the rotation numbers are introduced. However, since driving wheel 6 side (a tire axle side) is at a heavy inertia side called a vehicle body, a rotation variation is difficult to occur against the impact input and, since transmission output shaft 41 side is a light inertia against driving wheel 6 side, the rotation variation is easy to occur against the impact input.

Figure 7B:
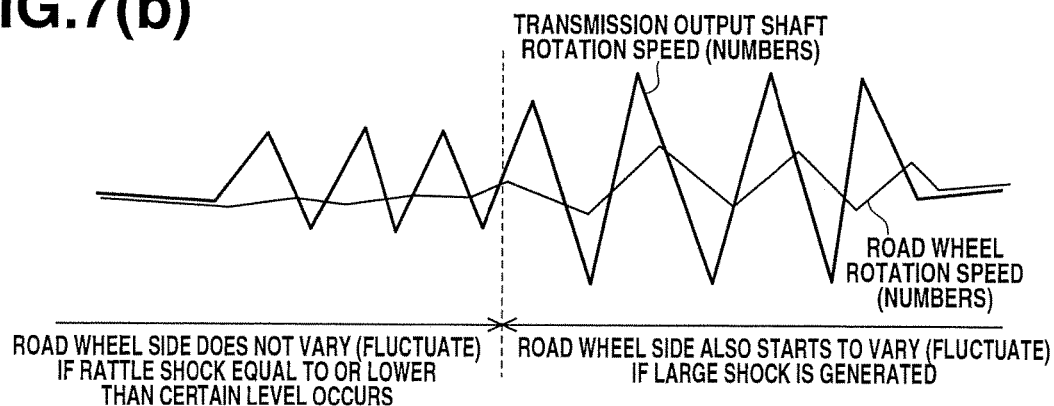

Hence, as shown in FIG. 7(b), large vertical variations are generated in the transmission output shaft rotation numbers but the vertical variations of the tire wheel rotation numbers are slight. It should herein be noted that, in a case where the rattle shock becomes large, there are some cases where the vertical variations of the tire wheel rotation numbers become large.

It should also be noted that, since there are some cases where a differential between left and right road wheels occurs during a vehicular turning and the tire wheel rotation numbers do not become correspondent with the vehicle speed, vehicle speed calculating section 8B basically calculates vehicle speed VS using the transmission output rotation numbers under a situation under which the vertical variations of the rotation numbers are not generated in the rotation numbers information detected by transmission output shaft rotation number sensor 90.

Figure 8:
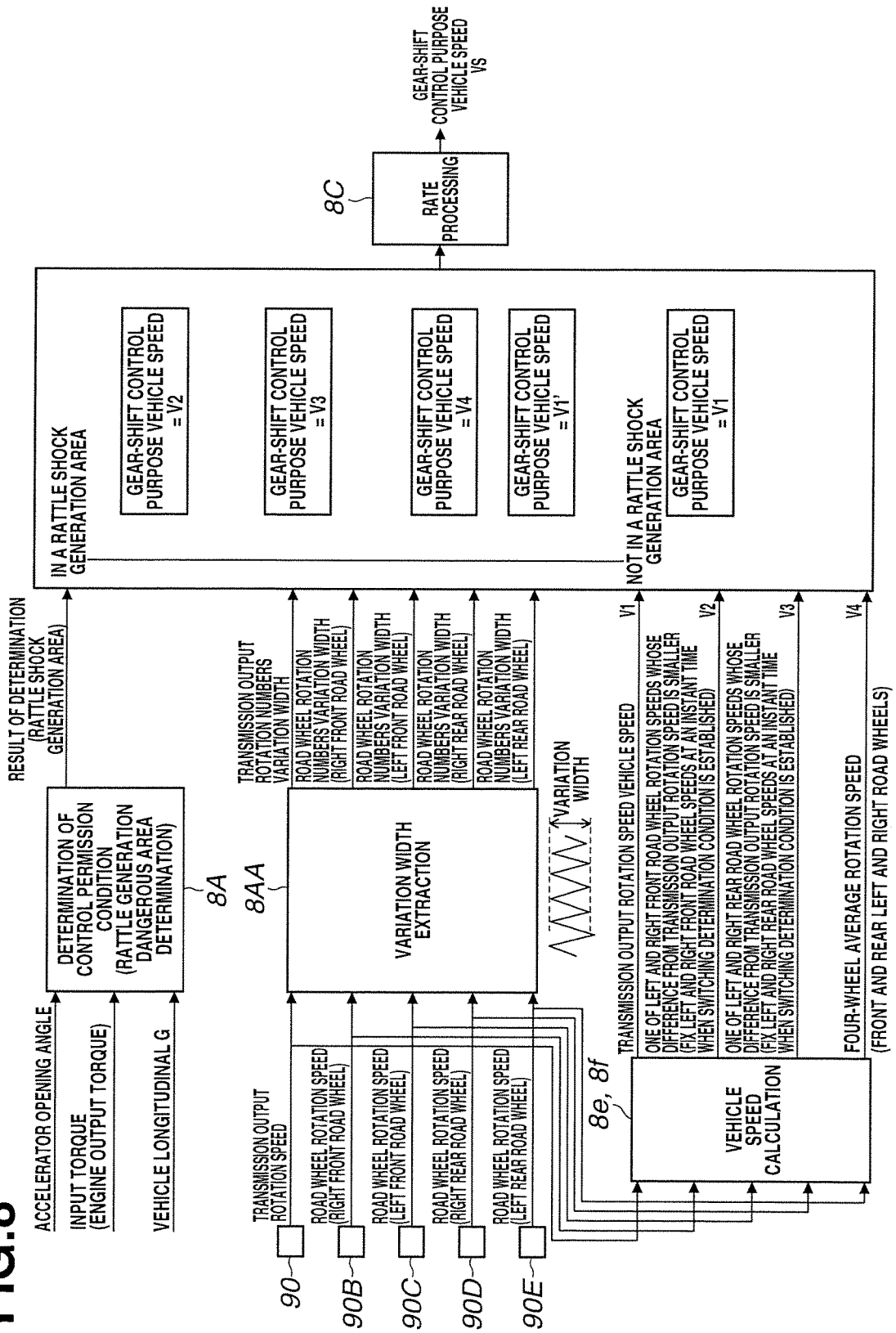
FIG. 8 is a block diagram representing an essential part structure of the control apparatus for the vehicular automatic transmission in the preferred embodiment according to the present invention.

Therefore, vehicle speed calculating section 8B, as shown in FIGS. 1 and 8, includes: a control condition determining section (control condition determining means) 8A configured to determine a preset predetermined condition (a control permission condition) as a condition under which the vertical variations of the output shaft rotation numbers are generated, namely, the tire wheel rotation numbers information is used; a first calculating section (road wheel speed base calculating section) 8*e* configured to calculate vehicle speed VS on a basis of the tire wheel rotation numbers detected by any one of the road wheel speed sensors 90B through 90E; a second calculating section (output shaft rotation numbers base calculating section) 8*f* configured to calculate vehicle speed VS on a basis of rotation numbers detected by transmission output shaft rotation numbers (rotation speed) sensor 90; and a vehicle speed selecting section (vehicle speed selecting means) configured to select vehicle speeds V2 through V4 calculated by first calculating section 8*e* as a control purpose vehicle speed (detected vehicle speed) when the control permission condition (predetermined condition) is established and to select vehicle speed V1 calculated by second calculating section 8*f* as the control purpose vehicle speed (vehicle speed selecting means) 8*g* when the control permission condition is not established.

For the control permission condition of control permission condition 8A, the following four conditions of (A) through (D) are set. If all of the following four conditions are established, the control permission condition is established.
(A) The driver is requesting the output torque to engine 1.
(B) The driving torque outputted from engine 1 to driving wheels 6 is in the minute state in which this driving torque is equal to or below predetermined torque $T_0$.
(C) Vehicular longitudinal acceleration Gv is in the sate in which vehicular longitudinal acceleration Gv is in a proximity of zero (namely, the state in which longitudinal acceleration Gv is equal to or below $Gv_0$).
(D) Each of driving wheels 6 is not slipped.

It should be noted that the conditions of (A) through (C) described above are conditions (A) through (C) of a rattle shock generation area in which the above-described rattle sound and the vertical variations of the rotation numbers of the rotational element are generated. The condition that (D) each driving wheel 6 is not slipped is an essential requirement for a case where vehicle speed VS is calculated from the rotation numbers of the rotational element in the power transmission system.

It should also be noted that vehicle speed selecting section 8*g* selects any one or more of the tire wheel rotation numbers information of a plurality (in this embodiment, four) of road wheel speed sensors 90B through 90E and calculates vehicle speed VS utilizing the selected one or more of the road wheel speed sensors. At this time, vehicle speed selecting section 8*g* selects any one or more of the road wheel speed sensors 90B through 90E which are used on a basis of a tire wheel rotation number width and a difference between the tire wheel rotation numbers (rotation speed) and the transmission output shaft rotation numbers (rotation speed). It should be noted that once one or more of road wheel speed sensors 90B through 90QE which is or are used is selected, a selection change is not carried out during a continuation of the related control.

Thus, CVTECU 8 includes a variation width extracting section 8AA configured to extract variation widths (variation levels) of the transmission output shaft rotation numbers information outputted from transmission output shaft rotation numbers (rotation speed) sensor 90 and respective tire wheel rotation numbers (rotation speed) information outputted from road wheel speed sensors 90B through 90E. This variation width extracting section 8AA can extract each of the variation widths by performing a processing of rotation numbers information with a band pass filter and/or by performing a processing of a differential value of the rotation numbers information with a low-pass filter.

Vehicle speed selecting section 8*g* selects one or more of road wheel speed sensors 90B through 90E to be used on a basis of the tire wheel rotation numbers variation widths and a difference between each of the four tire wheel rotation numbers and transmission output shaft rotation numbers in the following way.

(1) First, the vehicle speed selecting section determines whether each of the tire rotation numbers variation widths of left and right front wheels 6*a*, 6*b* is equal to or below (smaller) a predetermined value. In this case, the predetermined value is preset as a threshold value above which each of the variation widths is permissible.

The reason why vehicle speed selecting section focuses on the determination of tire wheel rotation numbers variation widths of front road wheels 6*a*, 6*b* is that, as appreciated from FIG. 6, the vehicle in this embodiment is the four wheel drive vehicle based on a front wheel drive vehicle. In other words, as compared with rear road wheels 6*c*, 6*d*, front wheels 6*a*, 6*b* are placed at positions near to transmission output shaft 41 whose rotation numbers (rotation speed) are detected by transmission output shaft rotation numbers (rotation speed) sensor 90 with a power transmission path taken into consideration and there is a high probability that the difference from the detection value of transmission output shaft rotation numbers sensor 90 is smaller in the case of front road wheels 6*a*, 6*b* than in the case of rear road wheels 6*c*, 6*d*.

It should herein be noted that, if each of the tire wheel rotation numbers variation widths of left and right front road wheels 6*a*, 6*b* is equal to or below the predetermined value, vehicle speed selecting section 8*g* selects one of the front road wheel rotation speed (numbers) sensors which detects the rotation speed (rotation numbers) whose difference from the output shaft rotation speed (numbers) is smaller than the other front road wheel rotation speed sensor (nearest to the output shaft rotation numbers (speed)) and sets vehicle speed V2 based on this selection as the gear-shift control purpose vehicle speed.

(2) If at least either of the tire wheel rotation numbers variation widths of left and right rear road wheels 6*c*, 6*d* is larger than the predetermined value, vehicle speed selecting section 8*g* determines whether each of the tire wheel rotation numbers variation widths of left and right rear road wheels 6*c*, 6*d* is equal to or below the predetermined value. If each of the tire wheel rotation numbers widths of left and right road wheels 6*c*, 6*d* is equal to or below the predetermined value, one of the road wheel rotation speed (numbers) sensors which detects the rotation speed (numbers) whose difference from the output shaft rotation speed (numbers) is smaller than the other detected by the other road wheel rotation speed (numbers) sensor is selected and vehicle speed V3 based on this is set as the gear-shift control purpose vehicle speed.

(3) If at least either of the tire rotation numbers variation widths of left and right rear road wheels 6*c*, 6*d* is larger than the predetermined value, vehicle speed selecting section 8g compares the output shaft variation width with all of four tire wheel rotation speed (numbers) variation widths. Then, if the output shaft rotation numbers (rotation) variation width is larger than all four wheel rotation speed variation widths, vehicle speed V4 based on an average value of the four road wheel rotation numbers is set as the gear-shift control purpose vehicle speed.

(4) If the output shaft rotation numbers variation width is equal to or below each of the four road wheel tire wheel rotation numbers variation widths, the gear-shift control purpose vehicle speed is derived from the output shaft rotation numbers. It should be noted that, in this case, vehicle speed V1' based on the rotation numbers information which is an elimination of a particular frequency region from the rotation numbers information detected by transmission output shaft rotation numbers (speed) sensor 90.

Figure 11:
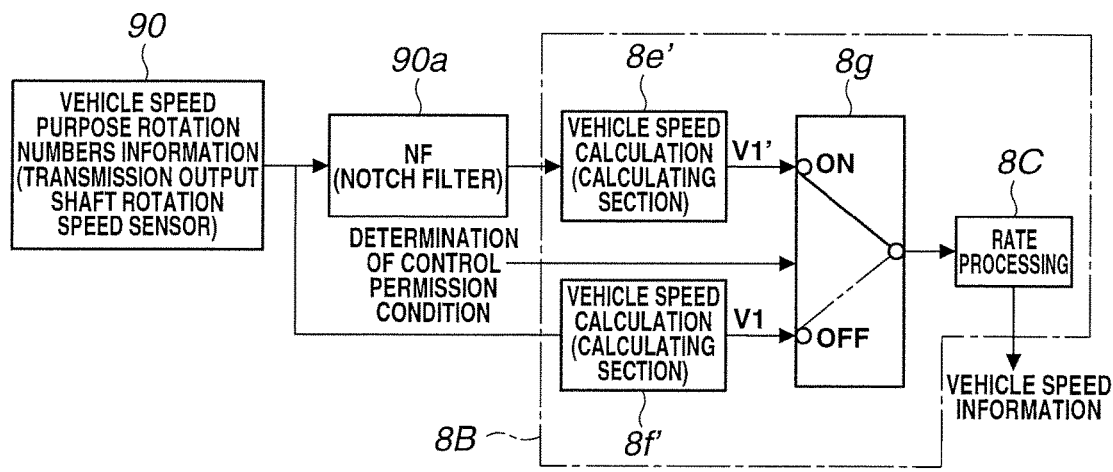
FIG. 11 is a block diagram representing an essential part structure of the control apparatus for the vehicular automatic transmission.

In a case where notch filter 90a is used, as shown in FIG. 11, vehicle speed calculating section 8B processes the rotation numbers (rotation speed) detected by transmission output shaft rotation numbers (speed) sensor 90 with notch filter 90a and calculates vehicle speed V1' on a basis of this filter processed rotation numbers.

It should be noted that, since each of the calculation of vehicle speed V1' based on the filter processed rotation numbers with a calculating section 8e' and the calculation of vehicle speed V1 based on not filter processed detection rotation numbers with a calculating section 8f' calculate the vehicle speed from a time interval of rotation numbers information (a pulse signal) periodically inputted, continuous calculations are needed and the calculations of these vehicle speeds are at any time carried out in parallel to each other.

Figure 12:
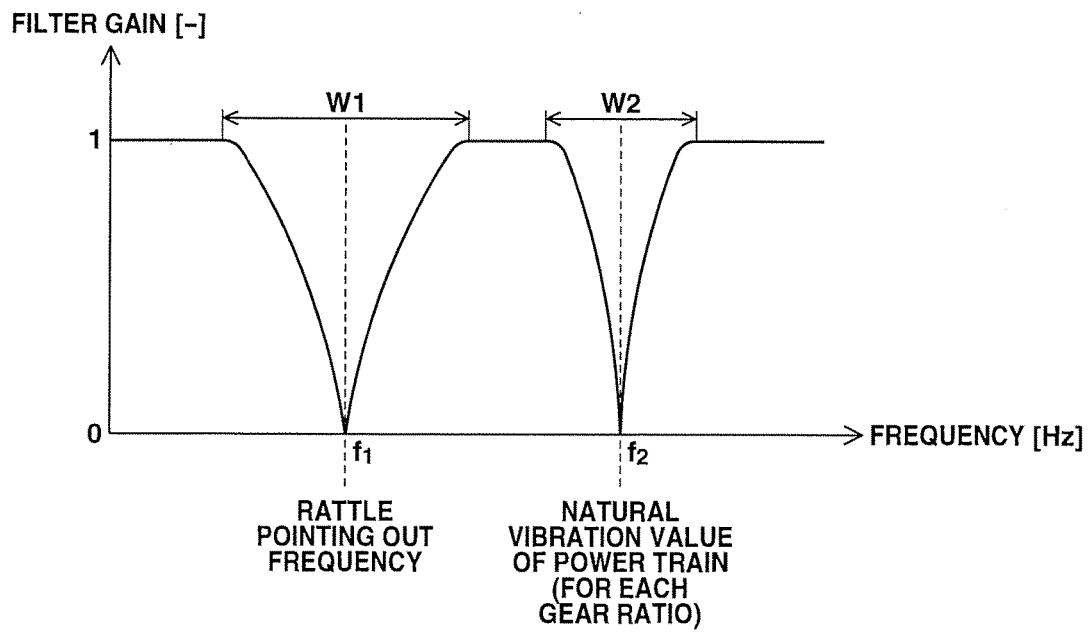
FIG. 12 is a filter characteristic view for explaining a notch filter applied to the control apparatus for the vehicular automatic transmission in the preferred embodiment according to the present invention.

It should also be noted that, since the calculation of the vehicle speed based on the rotation numbers information of the road (tire) wheel speeds in addition to the rotation numbers information of the transmission output shaft is carried out from the time interval of periodically inputted rotation numbers information (the pulse signal), the continuous calculation is needed. Thus, the calculation of vehicle speed VS using transmission output shaft rotation numbers information is, at any time, carried out by vehicle speed calculating section 8f in parallel Notch filter 90a, as shown in FIG. 12, attenuates an input amplitude in a notch shape by a desired width W at a desired frequency f. Notch filter 90a, in this embodiment, is designed to attenuate the input amplitude in the notch shape to desired amplitudes W1, W2 in a vertical variation frequency $f_1$ under the situation under which the rattle sound and the vertical variation frequency $f_2$ when a natural vibration of engine (power train) 1 is transmitted to transmission output shaft 41.

In other words, particular frequency areas in which notch filer 90a serves to attenuate include the frequency area of a frequency component related to the vertical variations of the rotation speed (numbers) detected by transmission output shaft rotation numbers sensor 90 and include the frequency area of the vibration in which the natural frequency of engine (driving source) 1 is transmitted to transmission output shaft 41 in accordance with the gear ratio.

In addition, vehicle speed calculating section 8B includes, in vehicle speed selecting section 8g, a rate processing section (rate processing means) 8C configured to perform a rate processing (a multi-rate signal processing) for smoothing the switching when vehicle speed VS is selectively switched among vehicle speeds V1 through V4 and V1' (namely, when the rotation numbers information to calculate the vehicle speed is switched). Rate processing section 8C limits the variation of the vehicle speed within a predetermined rate and smooths the switching when the vehicle is selectively switched.

[Action and Effect]

Since the control apparatus for the automatic transmission is structured as described hereinabove, vehicle speed calculating section 8B selects vehicle speed by vehicle speed calculating section 8B and the selected vehicle speed is used for the gear-shift control by gear-shift control section 8D in a way as shown in a flowchart of FIG. 9.

Figure 9:
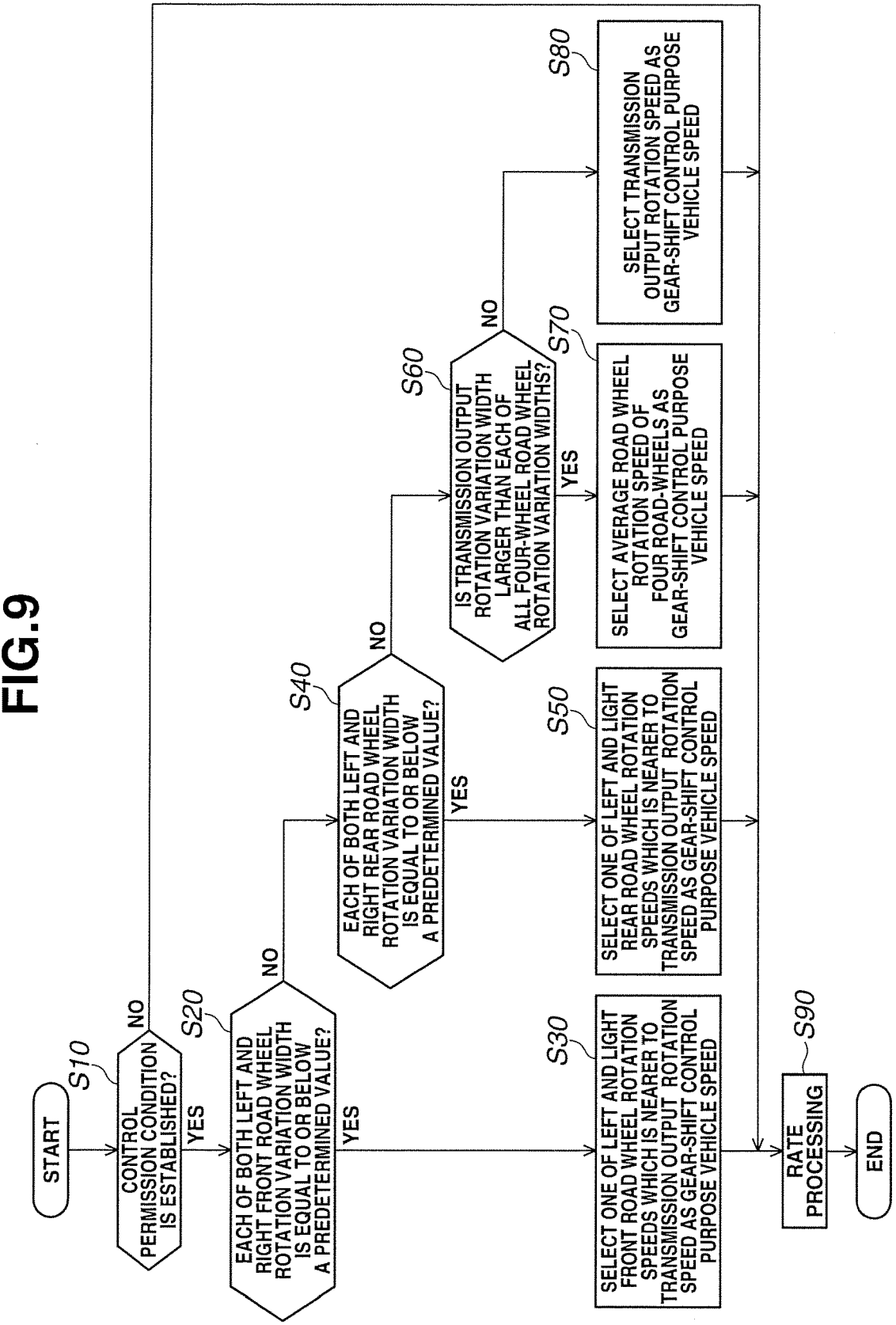
FIG. 9 is a flowchart for explaining a control carried out by the control apparatus for the vehicular automatic transmission in the preferred embodiment according to the present invention.

As shown in FIG. 9, vehicle speed calculating section 8B determines whether the control permission condition is established at a step S10. In other words, vehicle speed calculating section 8B determines whether each of the above-described four conditions (A) through (D) is established. If all of the above-described four conditions (A) through (D) are established, the control permission condition is established and the routine goes to a step S20. In this case, since the vehicle is in the rattle shock generation area, vehicle speed calculating section, in principle, utilizes the road wheel speeds (tire wheel rotation numbers).

First, vehicle speed calculating section 8B determines whether each of the tire wheel rotation numbers variation widths of left and right front wheels 6a, 6b is equal to or below the predetermined value.

It should herein be noted that, in a case where each of the tire wheel rotation numbers variation widths of the left and right front wheels 6a, 6b is equal to or below the predetermined value, the routine goes to a step S30 at which one of the road wheel speed sensors for the left and right front road wheels 6a, 6b whose difference from the transmission output shaft rotation numbers (speed) is smaller than that of the other front road wheels (the nearest to the output shaft rotation numbers (speed)) is selected and is set as the gear-shift control purpose vehicle speed.

If at least either of the tire wheel rotation variations widths of left and right front wheels 6a, 6b is larger than the predetermined value, vehicle speed calculating section 8D determines whether each of the tire wheel rotation numbers widths of left and right rear road wheels 6c, 6d is equal to or below the predetermined value at a step S40. It should herein be noted that, if each of the tire wheel rotation numbers variation widths of left and right rear road wheels 6c, 6d is equal to or below the predetermined value, one of the road wheel speed sensors for the left and right rear road wheels 6c, 6d whose difference from the transmission output shaft rotation numbers (speed) is smaller than that of the other rear road wheel (the nearest to the output shaft rotation numbers (speed)) is selected and is set as the gear-shift control purpose vehicle speed (at a step S50).

If at least either of the tire wheel rotation variations widths of left and right rear road wheels 6c, 6d is larger than the predetermined value, vehicle speed calculating section 8D determines whether the output shaft rotation variations width is larger than those of all of four road wheels 6a, 6b, 6c, 6d (at a step S60). If the output shaft rotation variations width is larger than those of all of four road wheels 6a, 6b, 6c, 6d, the gear-shift control purpose vehicle speed is determined from the average value of the four wheel tire wheel rotation numbers (at a step S70).

If the output shaft rotation numbers variation width is equal to or below any one of the four wheel tire wheel rotation variation widths, the gear-shift control purpose vehicle speed is determined from the transmission output shaft rotation numbers (speed) at a step S80.

It should be noted that, in this case, the gear-shift control purpose vehicle speed is calculated from the rotation numbers information which is the elimination of the particular frequency areas from the rotation numbers information detected by transmission output shaft rotation numbers sensor 90 at step 80.

Vehicle speed calculating section 8B outputs calculated vehicle speed VS through the rate processing appropriately at a step S90. In other words, vehicle speed selecting section 8g performs the rate processing through rate processing section 8C to smooth the switching when the switching is performed between the vehicle speed calculated by first vehicle speed calculating section 8e and the vehicle speed calculated by second vehicle speed calculating section 8f.

Figure 10:
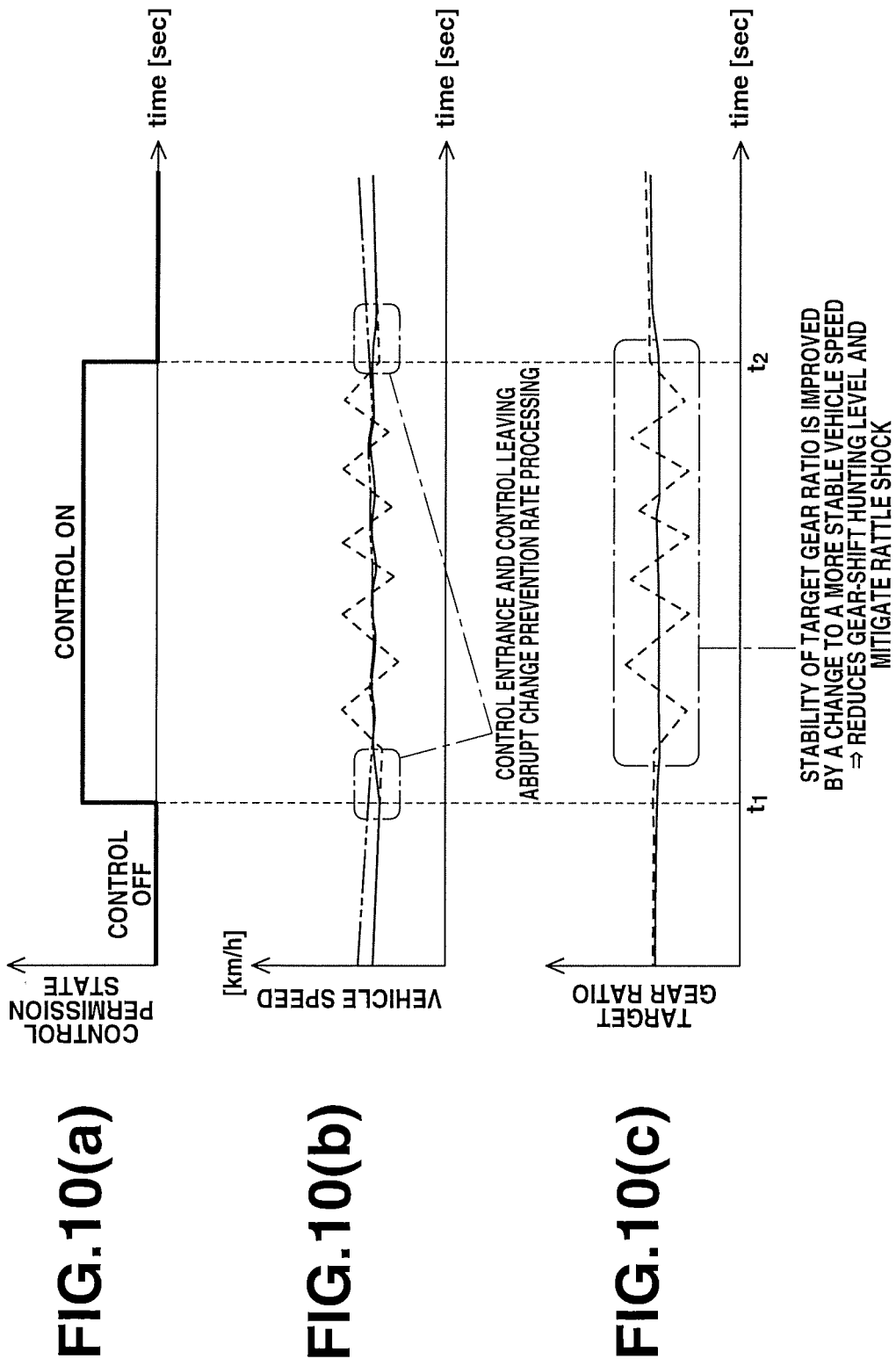
FIGS. 10(a), 10(b), and 10(c) are integrally a timing chart representing one example of the control carried out by the control apparatus for the vehicular automatic transmission in the preferred embodiment according to the present invention.

FIGS. 10 (a) through 10 (c) are integrally a timing chart for explaining one example of the control state. FIG. 10 (a) indicates a control permission situation, FIG. 10 (b) indicates a vehicle speed situation used for the gear-shift control, and FIG. 10 (c) indicates a situation of a target gear ratio through the gear-shift control. In FIGS. 10 (a) and 10 (b), solid lines denote cases where the control according to the control apparatus in this embodiment is carried out, dot lines denote cases where he control according to the control apparatus in this embodiment is not carried out, and dot-dot-and-dash (phantom) lines denote vehicle speeds V2, V3, V4 based on the road wheel speeds calculated even of the control is not carried out.

As appreciated from FIGS. 10 (a) through 10 (c), until the control is permitted (control ON) at a time point t1, vehicle speed VS calculated on a basis of the (original) rotation numbers (speed) detected by transmission output shaft rotation numbers (speed) sensor 90 in second calculating section 8f is selected as the gear-shift control purpose vehicle speed. At this time, vehicle speeds V2 through V4 based on the respective road wheel speeds and vehicle speed V1' based on the filter processed rotation numbers (speed) processed through notch filter 90a are calculated in parallel to vehicle speed VS1 based on not filter processed detection rotation numbers (speed).

When the control is permitted at time point t1 (control ON), vehicle speed VS is calculated using the tire (road) wheel speeds. However, the rate processing is carried out to prevent an abrupt change in the vehicle speed at a transient time entering the control. During the control, either vehicle speed VS based on the tire (road) wheel speeds or vehicle speed V1' based on the filter processed rotation numbers (speed) is used for the gear-shift control. Consequently, since either vehicle speed VS based on the tire (road) wheel speeds or vehicle speed V1' calculated due to the effect of notch filter 90a is stable in the rotation numbers (speed), a target gear ratio (a command value of gear ratio R) is accordingly stable so that a whole gear-shift servo system becomes stable. Thus, a gear-shift hunting level is reduced and a rattle shock can be relieved.

In addition, when the control is not permitted at a time point t2, calculated vehicle speed VS based on the (original) rotation numbers (speed) detected by transmission shaft rotation numbers (speed) sensor 90 is selected as the gear-shift control purpose vehicle speed. However, at another transient time leaving from the control, the rate processing to prevent the abrupt change in the vehicle speed is carried out. The rate processing at each of the transient times of the control entrance and the control leaving out permits the smooth switching of the vehicle speed and the achievement of the stable target gear ratio.

[Others]

As described hereinabove, the preferred embodiment according to the present invention has been explained. However, the present invention is not limited to the above-described preferred embodiments. Various modifications and partial adaptations cam be made in a range departing from a gist of the present invention, For example, in the above-described embodiment, notch filter 90a is structured by a hardware such as a filter circuit. However, the notch filter may be structured by a software. It should, however, noted that the processing through the notch filter is not essential. In addition, the rate processing means is structured by the software but may be structured by the hardware.

In addition, in the above-described embodiment, the present invention is applied to the automatic transmission in which the continuously variable transmission. However, the present invention is also applicable to the automatic transmission having a stepped transmission mechanism.

Furthermore, in the above-described embodiment, the driving source of the vehicle is the engine (internal combustion engine) but the driving source of the vehicle may be an electric motor (electrically driven motor) or may be the engine and the electric motor. The transmission may be a manual transmission.

The invention claimed is:

1. A control apparatus for a vehicular automatic transmission, the automatic transmission being a continuously variable transmission and equipped in a power transmission system between a driving source and driving wheels of a vehicle, comprising:
   a vehicle speed detector configured to detect a vehicle speed of the vehicle;
   an accelerator opening angle detector configured to detect an accelerator opening angle of the vehicle; and
   an electronic control unit configured to control a gear ratio of the automatic transmission on a basis of the vehicle speed detected by the vehicle speed detector and the accelerator opening angle detected by the accelerator opening angle detector,
   wherein the vehicle speed detector comprises an output shaft rotation numbers detector configured to detect rotation numbers of an output shaft of the automatic transmission and a road wheel rotation speed detector configured to detect rotation numbers of respective road wheels of the vehicle,
   wherein the electronic control unit is configured to calculate the vehicle speed from information of the road wheel rotation numbers when a preset predetermined condition is established as a condition under which vertical variations of the rotation numbers of the output shaft, either up or down, are generate, and to calculate the vehicle speed from the information of a rotation speed of the output shaft when the preset predetermined condition is not established, and
   wherein the predetermined condition includes three conditions, the three conditions being that an output torque request to the driving source is detected, a detected driving torque of the driving source is in a state equal to or below a torque determination threshold value, and a vehicular acceleration is in a state equal to or below an acceleration determination threshold value, all of the three conditions being established.

2. The control apparatus for the vehicular automatic transmission as claimed in claim 1, wherein the road wheel rotation speed detector is installed for the respective road wheels, and the electronic control unit is configured to select at least one of the respective road wheel rotation speed detectors whose vertical variation width of a detected road wheel rotation speed from among the respective road wheel rotation speed detectors at a time point at which the predetermined condition is determined to be established is equal to or below a reference value, and to calculate the vehicle speed from information of the selected road wheel rotation speed detector.

3. The control apparatus for the vehicular automatic transmission as claimed in claim 1, wherein the road wheel rotation speed detector is installed for the respective road wheels, and the electronic control unit is configured to select any one or more of the respective road wheel rotation speed detectors whose detected rotation speed is nearest to the rotation speed of the output shaft detected by the output shaft rotation numbers detector, from among the respective road wheel rotation speed detectors at a time point at which the predetermined condition is determined to be established, and to calculate the vehicle speed from the information of the selected road wheel rotation speed detector.

4. The control apparatus for the vehicular automatic transmission as claimed in claim 2, wherein the electronic control unit is configured to, in a case where all of vertical variation widths of the plurality of road wheel rotation speeds are neither equal to nor below the reference value when the predetermined condition is established, determine whether the vertical variation width of the rotation speed of the output shaft is larger than each of the vertical variation widths of all of the rotation speeds of all road wheel rotation speed detectors, calculate the vehicle speed from an average value of the plurality of road wheel rotation speeds when a positive determination that the vertical variation width of the rotation speed of the output shaft is larger than each of the vertical variation widths of the rotation speeds of all of the road wheel rotation speed detectors is made, and calculate the vehicle speed from the rotation speed of the output shaft when a negative determination is made.

5. The control apparatus for the vehicular automatic transmission as claimed in claim 4, further comprising a notch filter configured to eliminate a particular frequency area from the information of the rotation speed inputted to the electronic control unit,
wherein the particular frequency area includes a frequency area of a frequency component related to the vertical variations of the rotation speed of the output shaft generated due to a periodic variation of the driving torque inputted to the driving wheels in a state in which the driving torque of the driving source inputted to the automatic transmission is equal to or below the torque determination threshold value, and the electronic control unit is configured to calculate the vehicle speed from the information detected by the output shaft rotation speed detector which is filter processed through the notch filter.

6. The control apparatus for the vehicular automatic transmission as claimed in claim 5, wherein the particular frequency area includes a frequency area of vibrations of the output shaft in accordance with a gear ratio related to a natural frequency of the driving source.

7. The control apparatus for the vehicular automatic transmission as claimed in claim 1, wherein the electronic control unit is configured to perform rate processing configured to smooth switching when the information of the rotation speed to calculate the vehicle speed is switched.

\* \* \* \* \*